(12) United States Patent
Calhoun

(10) Patent No.: US 8,369,184 B2
(45) Date of Patent: Feb. 5, 2013

(54) SYSTEMS AND METHODS WITH IMPROVED THREE-DIMENSIONAL SOURCE LOCATION PROCESSING INCLUDING CONSTRAINT OF LOCATION SOLUTIONS TO A TWO-DIMENSIONAL PLANE

(75) Inventor: Robert B. Calhoun, Oberlin, OH (US)

(73) Assignee: Shotspotter, Inc., Mountain View, CA (US)

( * ) Notice: Subject to any disclaimer, the term of this patent is extended or adjusted under 35 U.S.C. 154(b) by 144 days.

(21) Appl. No.: 12/694,259

(22) Filed: Jan. 26, 2010

(65) Prior Publication Data

US 2010/0195445 A1  Aug. 5, 2010

Related U.S. Application Data

(60) Provisional application No. 61/147,136, filed on Jan. 26, 2009.

(51) Int. Cl.
*G01S 3/80* (2006.01)
(52) U.S. Cl. .......................... 367/127; 367/118; 367/124
(58) Field of Classification Search .................. 367/127
See application file for complete search history.

(56) References Cited

U.S. PATENT DOCUMENTS

| | | | | |
|---|---|---|---|---|
| 5,029,145 | A * | 7/1991 | Marsden et al. | 367/56 |
| 5,544,126 | A * | 8/1996 | Berryhill | 367/52 |
| 5,973,998 | A | 10/1999 | Showen et al. | |
| 6,178,141 | B1 * | 1/2001 | Duckworth et al. | 367/127 |
| 6,680,696 | B1 * | 1/2004 | Hayashi | 342/357.2 |
| 7,474,589 | B2 | 1/2009 | Showen et al. | |
| 7,495,998 | B1 * | 2/2009 | Deligeorges et al. | 367/127 |
| 2003/0112235 | A1 * | 6/2003 | Grace | 345/419 |
| 2004/0021664 | A1 * | 2/2004 | Takemoto et al. | 345/419 |
| 2004/0032796 | A1 * | 2/2004 | Chu et al. | 367/123 |
| 2005/0100176 | A1 * | 5/2005 | Chu et al. | 381/92 |
| 2005/0140548 | A1 * | 6/2005 | Spirito | 342/462 |
| 2006/0098830 | A1 * | 5/2006 | Roeder et al. | 381/310 |
| 2006/0198527 | A1 * | 9/2006 | Chun | 381/17 |
| 2006/0262117 | A1 * | 11/2006 | Chiba | 345/440 |

(Continued)

FOREIGN PATENT DOCUMENTS

| | | |
|---|---|---|
| EP | 0515728 A2 | 12/1992 |
| KR | 10-2006-0058581 A | 5/2006 |
| KR | 10-2008-0037225 A | 4/2008 |

OTHER PUBLICATIONS

International Search Report dated Oct. 12, 2010 in counterpart PCT application No. PCT/US2010/022149 (W02010/085822).

*Primary Examiner* — Isam Alsomiri
*Assistant Examiner* — James Hulka
(74) *Attorney, Agent, or Firm* — DLA Piper LLP (US)

(57) ABSTRACT

Systems and methods are disclosed associated with processing origin/location information of a source or event. In one exemplary implementation, there is provided a method of performing improved three-dimensional source location processing including constraint of location solutions to a two-dimensional plane. Moreover, the method includes obtaining a plane of constraint characterized as a plane in which the source is likely to occur, providing one or more virtual sensing elements each characterized as being located on a first side of the plane of constraint in a mirror image/symmetrical position across from a corresponding actual sensing element on an opposite side of the plane, and constraining possible origin locations to be located in the plane of constraint. Other exemplary implementations may include determining the origin location as a function of positions of the sensing elements and the virtual sensing elements as well as time-of-arrival and/or angle-of-arrival information.

21 Claims, 8 Drawing Sheets

U.S. PATENT DOCUMENTS

| | | | |
|---|---|---|---|
| 2007/0002040 A1* | 1/2007 | Oldroyd | 345/419 |
| 2007/0099627 A1* | 5/2007 | Kofol et al. | 455/456.1 |
| 2007/0132637 A1* | 6/2007 | Kolavennu et al. | 342/450 |
| 2007/0133352 A1 | 6/2007 | Kim | |
| 2007/0159924 A1* | 7/2007 | Vook et al. | 367/127 |
| 2008/0042901 A1 | 2/2008 | Smith | |

* cited by examiner

SYSTEMS AND METHODS WITH IMPROVED THREE-DIMENSIONAL SOURCE LOCATION PROCESSING INCLUDING CONSTRAINT OF LOCATION SOLUTIONS TO A TWO-DIMENSIONAL PLANE

CROSS-REFERENCE TO RELATED APPLICATIONS

This application claims benefit/priority of provisional application No. 61/147,136, filed Jan. 26, 2009, which is incorporated herein by reference in entirety.

BACKGROUND

1. Field

Aspects of the present innovations relate to origin/location estimation, and, more particularly, to systems and methods associated with processing origin/location information of a source or event.

2. Description of Related Information

Methods of determining the location of a signal source based on the arrival time measurement and/or arrival angle measurements of signals sent by or reflected off of the source object have numerous technological uses. Examples include the computation of the epicenter of an earthquake from the arrival time of the ground motion received at a set of seismometers; location of a mobile wireless telephone handset by measurement of the arrival time and arrival angle of RF signals received by a set of wireless telephone base stations (known as "E-911"); location of an aircraft via measurement of the arrival time of RF radiation reflected off of the aircraft a received by a radar receiver; and acoustic location of a weapon discharge event by measurement of the arrival time muzzle blast sound at a set of acoustic sensors.

Numerous existing techniques of source localization cover various aspects of the time difference of arrival location problem, including methods for determining the time differences of arrival accurately via cross-correlation or super-resolution techniques. Once time difference of arrivals have been computed, numerous methods can be used to compute the source location. For example, existing techniques in this vein include computations based on constant-spaced receivers and chi-square minimization methods.

Some techniques concern mixing various signal types in the source location problem, such as the combination of GPS and mobile telephone handset signals.

Still other techniques focus on the source location from the time differences of arrival and/or angle of arrivals. This process is often called "triangulation" but typically involves intersection of hyperboloids defined by the relative arrival time difference between pairs of receivers at known positions. Triangulation methods include numerical solution to intersecting hyperbolas and cost-function minimization over three base stations.

In short, prior methods in the field of source localization either constrain the source in two-dimensions by solving the entire problem in two dimensions, thus neglecting the effects of the third dimension on the source-receiver travel time, or they localize the source in three dimensions, which makes correct use of the source-receiver distance but which can generate unsuitable results, such as when unavoidable errors are introduced in measurement of the time of arrival of a signal, or in the positions of the receivers, or in the knowledge of the propagation velocity in the signal medium. One or more aspects consistent with the innovations herein may overcome existing drawbacks or limitations, such as above, via methods involving improved location estimation processing features, which may include constraining source locations to an arbitrary plane, such as a local approximation of the surface of the Earth.

SUMMARY

Systems and methods consistent with the innovations herein are directed to calculation of improved source/origin location estimates. In one exemplary implementation, there is provided a method of improving accuracy of three-dimensional source locations by constraining location solutions to a two-dimensional plane.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

DESCRIPTION OF THE DRAWINGS

The accompanying drawings, which constitute a part of this specification, illustrate various implementations and aspects of the present invention and, together with the description, explain the principles of the invention. In the drawings.

DETAILED DESCRIPTION

Figure 1:
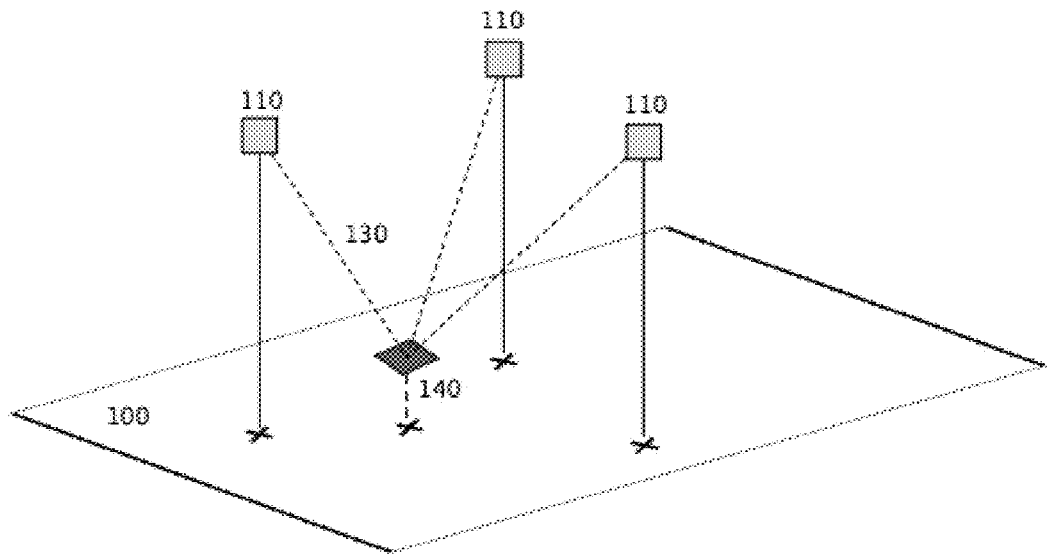
FIG. 1 is a diagram of a prior source location estimation system.

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

With regard to certain aspects of the innovations herein, the source location problem may be viewed, in general, as a three-dimension problem. With regard to location of smart/mobile phones, for example, the mobile telephone base stations are frequently located on the top of high towers or buildings, while mobile telephone users are typically at a lower elevation, such as on the street or in a building. Similarly, acoustic sensors used for gunshot location are preferentially located on the tops of buildings, while individual typically fire shots from ground level. Many existing triangulation routines neglect the three-dimensional nature of the problem and solve the problem in two dimensions. This results in negligible errors in the source location when the both the source and the receivers are nearly in plane, for example when an xy distance from source to receiver is much larger than the difference in elevation between source and receiver, such as 1000 m source-to-sensor distance and 10 m difference in elevation. Other routines compute the full three-dimensional solution, which is appropriate for situations where the source can be located anywhere in three dimensions. Examples include locating aircraft or the epicenter of an earthquake, which are generally located under the surface of the earth.

There may be downsides to location processing in three dimensions. For example, a minimum of four time-of-arrival receivers may be required to localize a source in three dimensions, while only three receivers may be required to localize a source in two dimensions. Furthermore, the additional degree of freedom increases the likelihood of a source location error when the underlying data/information, such as time difference of arrivals or the receiver positions, are not measurable with complete accuracy.

In certain applications, some consistent with aspects of the innovations herein, the source position is known to lie on a specific plane. For example, when looking for a hostile shooter in a rural environment, the shooter can be reasonably assumed to be on or within a few meters of earth's surface. In urban areas the maximum displacement from the surface of the earth can be estimated from the height of typical buildings in the coverage area. In such applications, a source position elevation that resolves to above the height of the tallest buildings or below the surface of the earth is nonsensical.

General purpose three-dimensional routines often return such nonsensical locations due to a variety of problems such as: unavoidable errors in the measurement of receiver positions; inaccurate or non-uniform signal propagation velocity (i.e. speed of sound through a thermal gradient); inaccurate measurement of signal arrival times due to echoes or multipath propagation; and poor receiver geometry. Poor receiver geometry means that the matrix of receiver positions is poorly conditioned in the linear algebra sense: for example, a set of four microphones mounted on aerostats or balloons all set at an elevation of around 500 m might have the following (x,y,z) coordinates:

(1000 m, 0 m, 750 m); (−1000 m, 0 m, 700 m); (0 m, 1000 m, 750 m); (0 m, −1000 m, 775 m).

Because the z-coordinates are so similar, such a microphone array will perform poorly when attempting to locate a shooter on the ground, especially when the shooter is far from a centroid of the receiver array.

Moreover, as may be seen in connection with the system of FIG. 1, small errors in the estimate of the speed of sound may result in inaccurate origin/location estimates. Referring to FIG. 1, acoustic receivers 110 may be located above the plane of the surface of the earth 100. Further, for example, the receivers 110 may have an incorrect measurement of the temperature, resulting in a speed of sound estimate that is too low. Use of a time-difference of arrivals routine with such incorrect speed of sound results in an initial source location estimate 140 which is nonsensically out-of-plane and at an incorrect xy location.

In accordance with aspects of the innovations herein, however, improved processing and/or superior results may be obtained by constraining the solution to the specific plane in which the source is known to lie. Systems and methods consistent with the innovations herein include features of source localization that constrain three-dimensional solutions to a given two-dimensional plane. Exemplary implementations entail processing beyond simply setting the z-axis of the output to a particular value, as such processing would not suffice, e.g., because the x- and y-components of the lowest error unconstrained three dimensional solution will have greater in-plane error than a constrained solution.

Consistent with the innovations herein, systems and methods are provided involving procedures and/or mechanisms for constraining the output of a three-dimensional source location algorithm to a specific two-dimensional plane. Such implementations enable the use of three-dimensional coordinates for receiver positions while constraining the source location to the plane in which it must lie from physical or other considerations. Use of three-dimensional receiver coordinates yields more accurate source-receiver distance estimates. Further use of such coordinates and processing may offer additional advantages when the receivers are at a significantly different elevation from the source, for example when the source is a on the ground and the receivers are airborne sensors.

Figure 2:
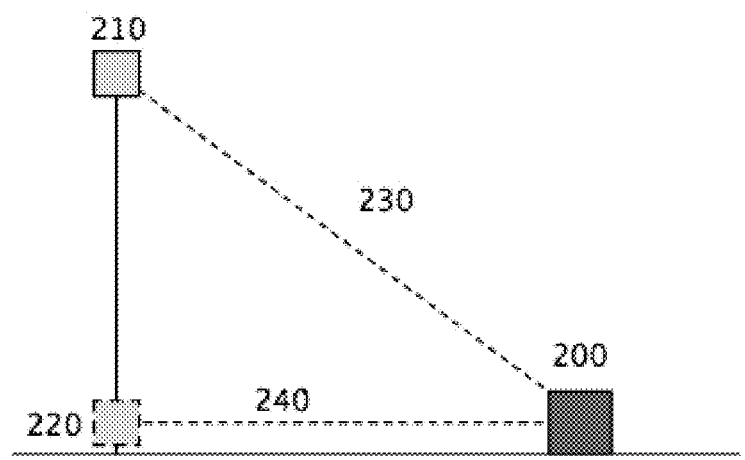
FIG. 2 is a diagram illustrating an exemplary distance calculation feature consistent with certain aspects related to the innovations herein.

FIG. 2, for example, illustrates an exemplary/representative implementation in which a signal is emitted by a source 200 at z=0 and detected at a receiver 210 placed at some elevation above the earth. The correct source-receiver distance to use is the three-dimensional path 230, rather than the two-dimensional approximation 240 that would be used for an assumed receiver position 220, i.e., when the z coordinate of the receiver were assumed to be 0.

In accordance with one or more aspects of the innovations herein, the constrained localization problem may be solved by introducing an additional set of "virtual receivers" that mathematically constrain the resulting solution. To effect such processing, we may define a "constraint plane" to be the flat two-dimensional surface on which we seek to constrain the location of the source. Prior knowledge of the likely position of the source, for example, may be used to obtain such a plane. Here, for each receiver detecting the signal, we may compute the coordinates of a virtual receiver that is a mirror image of the specified receiver on the other side of the plane. For example, if the constraint plane is the xy plane, the mirror image of point (a, b, c) is simply point (a, b, −c). A such, symmetry considerations enable utilization of processing/calculations wherein the real and virtual sensors 'receive' signals at the same time.

Figure 3:
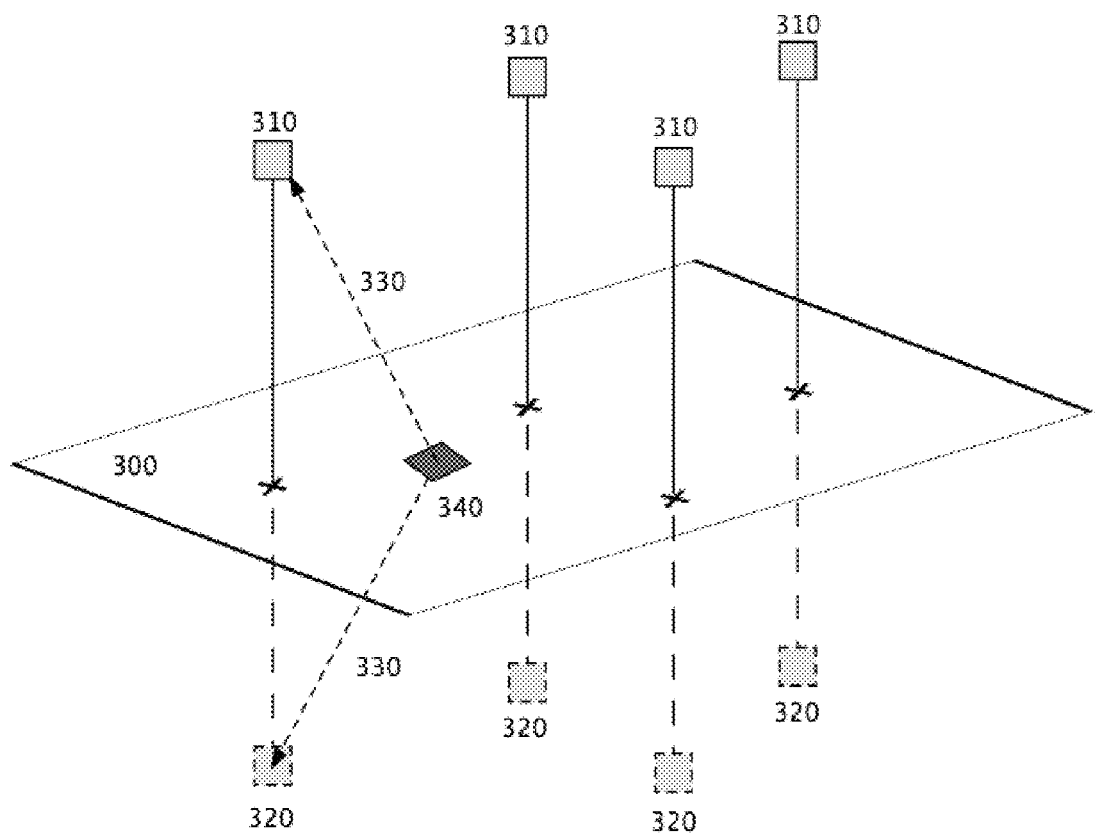
FIG. 3 is a diagram illustrating exemplary source localization calculation/processing features consistent with certain aspects related to the innovations herein.

As shown by way of example in FIG. 3, a constraint plane 300 is identified, across which the virtual receivers are set for performance of processing features herein. Again, the constraint plane 300 may be obtained in various ways. For example, physical considerations may be used to restrict the source position to the constraint plane 300, such as the surface of the earth. The constraint plane 300 may also be obtained via prior knowledge, derived based on factors present in the environment, surroundings or situation. For example, the plane of constraint may be obtained from a digital elevation model of terrain in the area of the sensing elements or receivers. Moreover, such digital models may be stored in the local elements, e.g., sensing elements, receivers, etc. Further, planar approximation of the terrain may be improved in quality by locating the source using a coarse terrain model that averages the terrain with a first plane over the entire coverage area of the receivers, computing an initial location using the first plane, re-approximating the terrain in a vicinity of the source to obtain a more exact/precise plane, and recalculating/relocating a superior location the source using new terrain approximation information and/or the more exact/precise plane.

In general, receivers 310 located above the plane 300 detect signal(s) emitted by a source 340. Consistent with the exemplary implementation of FIG. 3, solutions may be mathematically constrained to the plane 300 by introducing 4 additional virtual sensors 320, each of which is placed at the mirror image position with respect to the mirror plane 300, i.e., at points (a, b, c) and (a, b, −c) in this example, when reflecting around the xy-plane. As a function of the symmetry, calculations for each virtual receiver may then utilize advantageous processing features, e.g., using exactly the same distance from the source as the as the real receivers, using the same arrival times for each pair of real and virtual sensors, etc. Here, for example, systems and methods may perform source location calculations that include solving time difference of arrival equations using the 8 sensors, 4 real and 4 virtual. Further, the least-squares error will be constrained on the plane 300.

Most multi-sensor time difference of arrival triangulation routines use either numerical error-minimizing techniques or direct methods using the pseudoinverse to determine the best-fitting location in the least-squares sense, where the objection function being minimized is the differenced between the predicted and actual arrival times at each sensor. The best of these routines work well with overconstrained systems, limiting the number of time of arrival measurements used in the solution only by the amount of memory in the computer. By adding the virtual receiver processing, any motion of the solution off of the plane on one side results in an increase in error at the sensor on the other side. Consistent with aspects of the innovations herein, by placing a virtual sensor of each real sensor in the array on the other side of the mirror plane, the receivers are balanced and the solution is forced to be in the plane of constraint.

Notably, the additional computational effort required by doubling the number of sensors used in the calculation is not significant.

Figure 4:
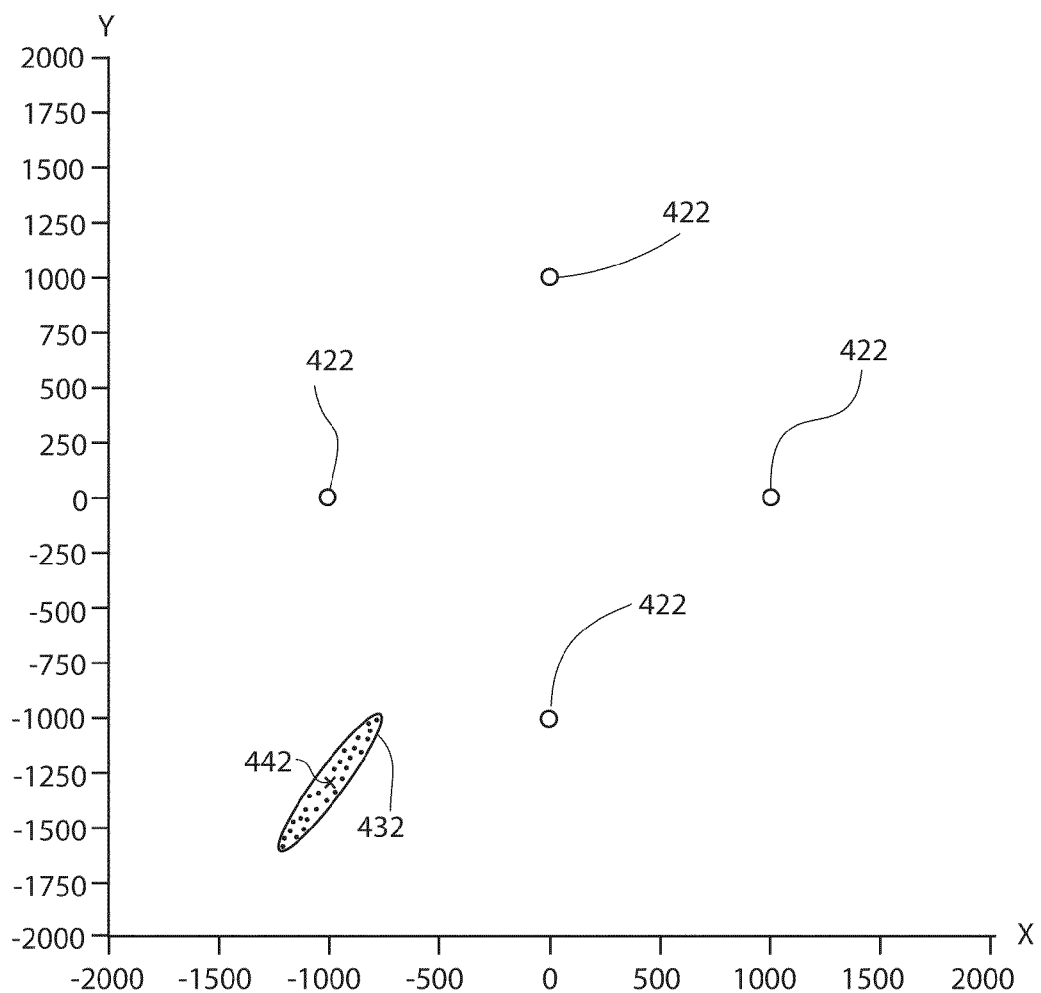
FIG. 4 is an exemplary graphical display illustrating a simulated performance of location processing features consistent with certain aspects related to the innovations herein.

FIG. 4 illustrates graphical results of a simulated performance of general three-dimensional location via acoustic time of arrival triangulation with the source 442 known to be located on the plane z=0, using four acoustic receivers 422 located at (1000, 0, 750), (−1000, 0, 700), (0, 1000, 725) and (0, −1000, 775), distances in meters. In this example, Gaussian random time of arrival errors were added to calculated arrival times, and the standard deviation of the errors was 10 msec. A collection of calculated/possible source locations 432 is shown. Here, mean RMS error in the xy plane of the computed location of the source is 85 meters.

Figure 5:
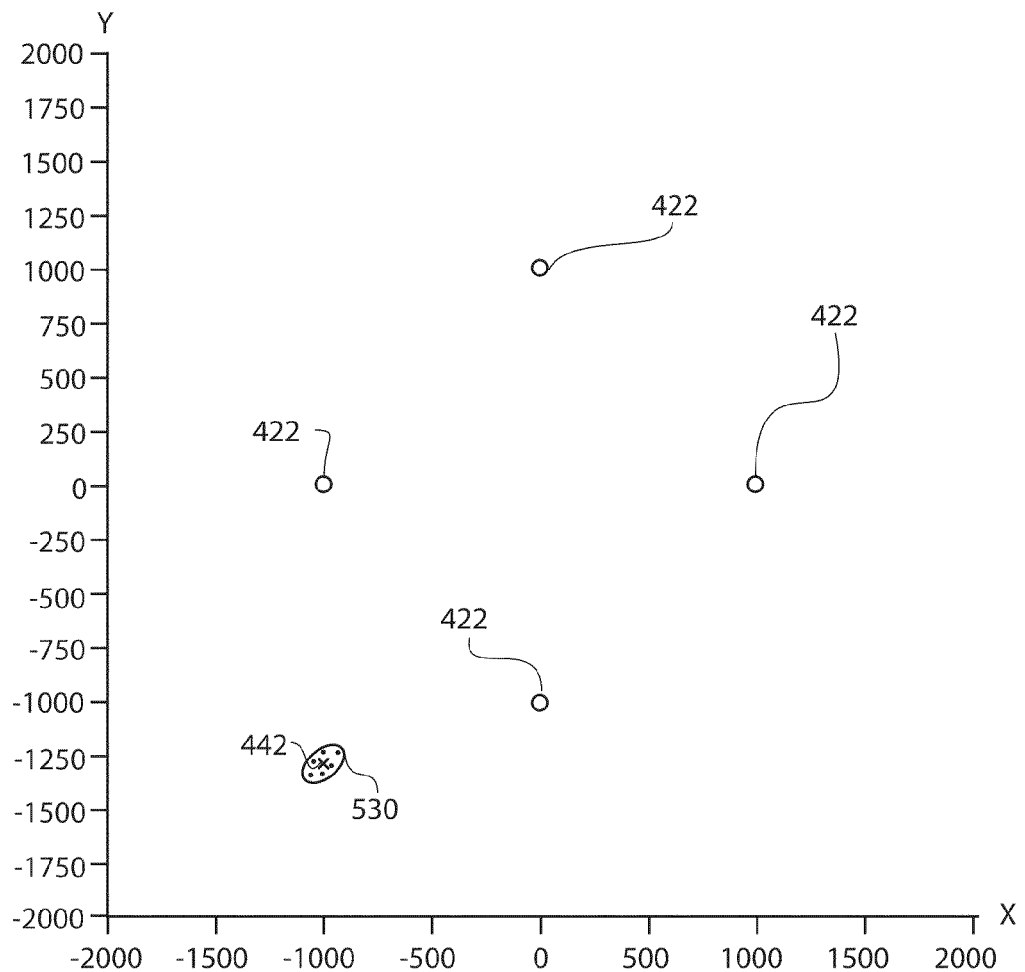
FIG. 5 is an exemplary graphical display illustrating a simulated performance of location processing features consistent with certain aspects related to the innovations herein.

FIG. 5 illustrates graphical results of an exemplary simulated performance of constrained three-dimensional location via acoustic time of arrival triangulation consistent with aspects of the innovations herein. The positions of the source 442 and the four acoustic receivers 422 are identical to FIG. 4, and the random errors are of the same magnitude. Here, however, the mean RMS error in the xy plane of the computed location of the source is only 12 meter when using processing consistent with the innovations herein. This is a seven-fold improvement, illustrated via the smaller collection 530 of calculated/possible source locations.

Moreover, in accordance with further implementations of the innovations herein, the constraint plane need not be confined to the xy-plane; the solution can be constrained to any plane in three-dimensional space. In this manner the innovations herein may be applied to terrain that is flat but at significant elevation above (or below) sea level, to terrain that is sloped in an arbitrary manner, or to terrain that may be modeled as flat for the region of interest. For more complicated terrain where the surface of the earth cannot be modeled adequately by a single plane, an iterative approach can be taken as follows: first, compute the best-fitting single plane approximation to the coverage area, using a least-squares fit of elevation data from a digital elevation model of the terrain. Add any desired offsets for the height of the source (i.e., weapon discharged from eye level). Next, generate virtual sensors by reflecting the receiver positions on the single plane approximation of the terrain, and then compute the source location from the time difference of arrivals on both real and virtual sensors. This will provide some (x, y, z) location constrained on the selected plane. Now that the source is more tightly localized, reconstruct the single-plane approximation of the terrain in the area immediately surrounding the location estimate. Because the area of the terrain being modeled is smaller, it can be more accurately represented. The location solution can then be re-computed using the new constraint plane. The process can be repeated until the solution converges. In most implementations, only a few iterations are needed to get an accurate solution.

Figure 6:
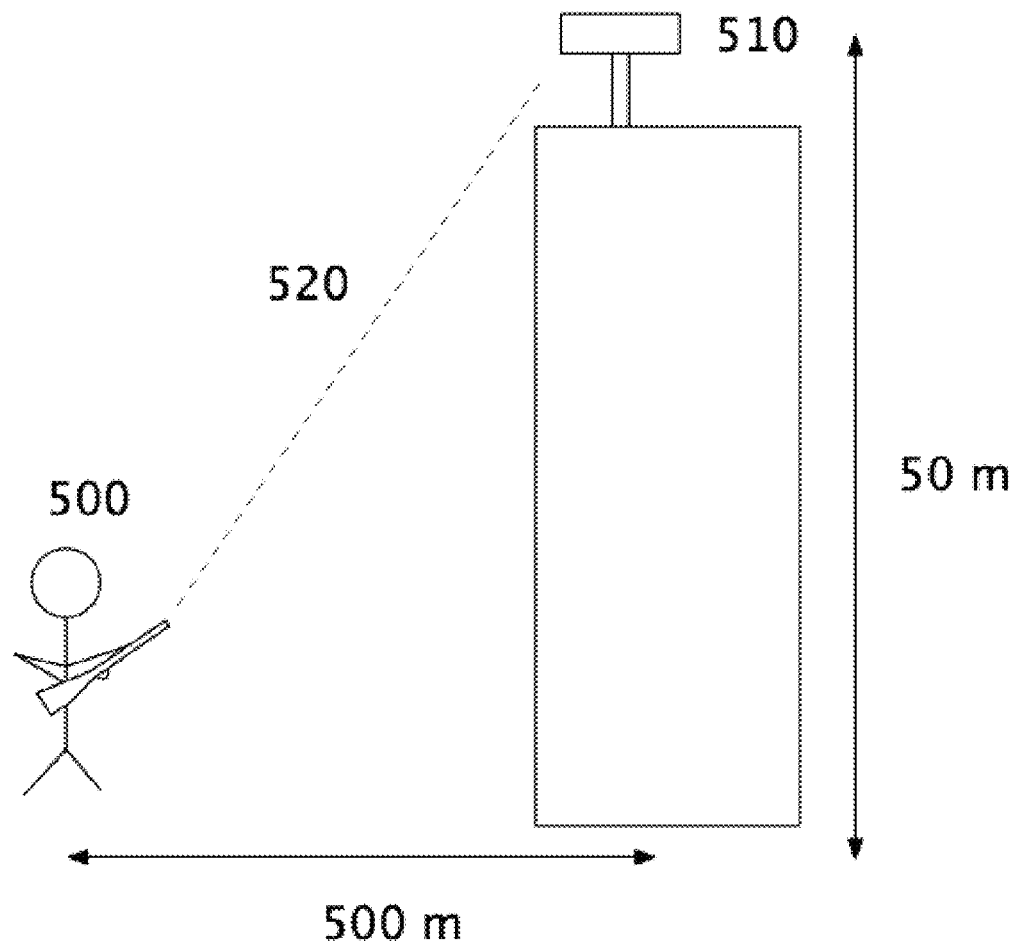
FIG. 6 is a diagram illustrating exemplary source localization calculation/processing features consistent with certain aspects related to the innovations herein.

In one exemplary application, systems and methods consistent with the innovations herein may be used to improve the accuracy of a public safety gunshot detection system. In such a system acoustic sensors are the receivers; the receivers are synchronized to a common time source such as GPS and may, e.g., be may be mounted on rooftops as described in Showen et al. U.S. Pat. No. 5,973,998. Such as system is illustrated schematically in FIG. 6, along with typical source-receiver distances. FIG. 6 depicts a not-to-scale illustration showing exemplary source-receiver spacing in a representative public safety gunshot location system context. Here, for example, a shooter 500 discharges weapon, the muzzle blast of which propagates at the speed of sound to sensor 510, with the shortest path being the direct line 520 between the shooter and sensor. With the exemplary distances shown (500 meters along the ground, and 50 meters in height), the shortest path in three dimensions is approximately 7 milliseconds longer than the two dimensional approximation of this problem would suggest.

Exemplary implementations consistent with such innovations include methods of determining/solving an origin location of a source of an acoustic signal or event by use of one or more sensing elements. Moreover such methods may comprise obtaining a plane of constraint characterized as a plane in which the source is likely to exist/occur, providing, for one or more sensing elements, one or more virtual sensing elements each characterized as being located on a first side of the plane of constraint in a symmetrical (mirror image) position across from its corresponding sensing element on an opposite side of the plane, constraining calculated/possible origin locations to be located in the plane of constraint, and determining the origin location as a function of positions of the sensing elements and the virtual sensing elements as well as time-of-arrival and/or angle-of-arrival information of acoustic energy from the source to the sensing elements and/or the virtual sensing elements.

Referring back to FIG. 6, the three-dimensional (direct line) path from shooter to sensor is 502.5 meters, while the two-dimensional approximation of the same distance is 500 meters. With the speed of sound around 340 m/s, this results in a 7 millisecond improvement in the accuracy of the predicted arrival time by using three dimensions. (In other words, the two-dimensional approximation underestimates the travel time by 7 milliseconds.) It should be noted that the magnitude of the improvement is not always so large that the computations are worth performing in three dimensions in absence of a plane of constraint, because the additional solution space made available by the general three-dimensional solution increases the likelihood that spurious noises will result in false positives. However, in accordance with the innovations herein, there is virtually no downside to using the actual three-dimensional locations of the acoustic sensors, as measured by GPS device or survey method, since in the public safety context shooters very nearly always discharge weapons from street level and the innovations herein allow the shooter's location to be constrained to said elevation.

Systems and methods consistent with the innovations herein may also be utilized in connection with processing/determining location information for radiofrequency emitters, such as mobile wireless handsets, smart phones, wireless devices, etc. Here, radiofrequency emissions may be located using the method of constraining the solution to a specific two-dimensional plane, such as a local approximation of the surface of the earth, in which the user of the handset is known to lie. With regard to such RF signal location processing, an exemplary method of determining/solving an origin location of a source of an RF signal or RF emission by use of one or more sensing elements, may comprise obtaining a plane of constraint characterized as a plane in which the source is likely to exist/occur, providing, for each sensing element, one or more virtual sensing elements each characterized as being located on a first side of the plane of constraint in a mirror image or symmetrical position across from a corresponding sensing element on an opposite side of the plane, constraining possible origin locations to be located in the plane of constraint, and determining the origin location as a function of positions of the sensing elements and the virtual sensing elements as well as time-of-arrival and/or angle-of-arrival information of RF energy from the source to the sensing elements and/or the virtual sensing elements.

Additionally, systems and methods consistent with the innovations herein may be utilized in connection with processing/determining more precise location information for devices incorporating GPS location features. Here, for example, exemplary methods of determining a more precise GPS location at a device may comprise obtaining position information of the device to establish an altitude or an offset from the ground/earth used to calculate a plane, using position information of satellite/GPS transmitters to determine locations of virtual satellite transmitter(s) across the plane, and calculating a more precise X-Y or lat-long position of the device as a function of location information of the satellite transmitters and the virtual satellite transmitters. Moreover, in some exemplary implementations, locations may be calculated as a function of emission from a GPS or similar receiver (the source) and wherein the plane used is the earth, with one or mote mirrored satellite transmitters being underneath the earth surface opposite their respective/actual counterpart satellite positions. Such methods may also include performing, via the GPS or similar device, an improved mirroring method, in which position information of the user/device is used to establish an altitude or an offset used to calculate the plane across which the one or more virtual satellite transmitters are located.

Further, the innovations herein may be extended to cover other aspects of the source location problem. Some receivers have the ability to determine both the time of arrival and the direction (or azimuth) of arrival. On acoustic sensors, the direction of arrival may be determined using a plurality of microphones at each receiving sensor, the relative arrival time on each microphone being determined using cross-correlation between a microphone signals or a related techniques. Further, in RF applications such as mobile wireless (e.g., telephone etc) unit location processing, the signal strength on directional antennas may be used to inform the direction of the handset.

Figure 7:
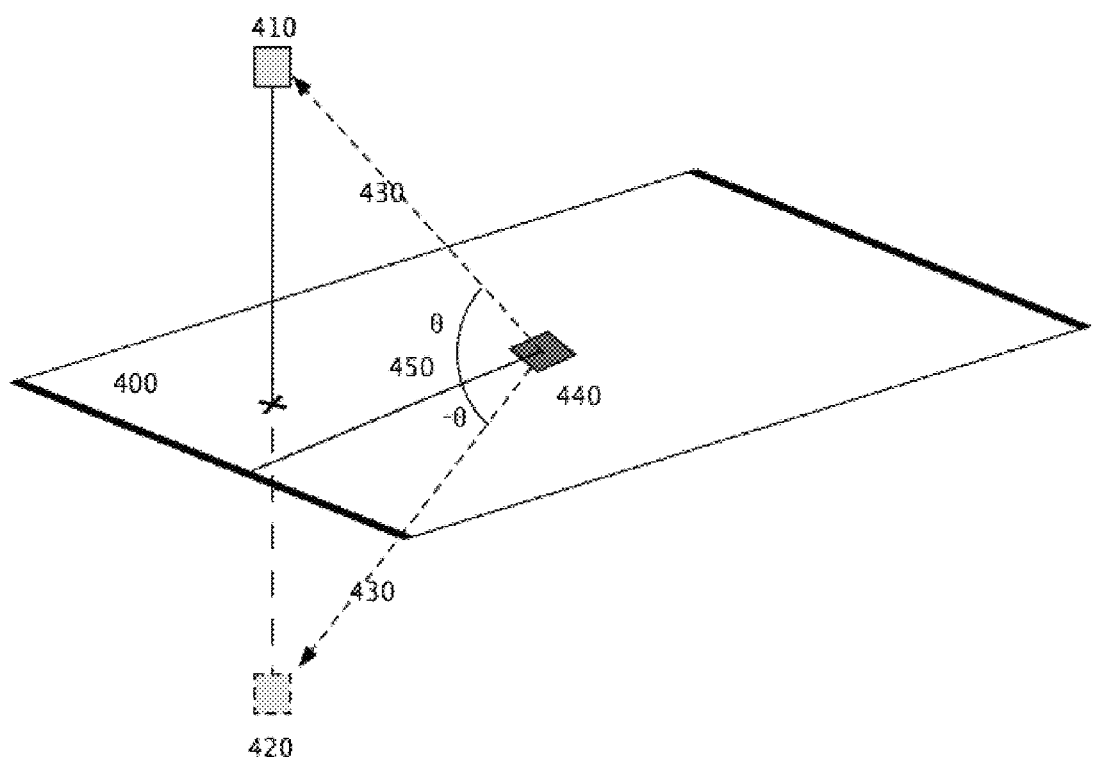
FIG. 7 is a diagram illustrating exemplary source localization calculation/processing features consistent with certain aspects related to the innovations herein.

The innovations herein may also be extended to angle of arrival processing including enabling use of angle of arrival signals in a constrained location. Angle of arrivals can be mirrored using the present invention to constrain a location solution to a fixed plane, as follows. Identify the constraint plane; measure the arrival vector of the signal from the source; reflect the arrival vector about the constraint plane; apply the arrival vector to the appropriate virtual sensor on the opposing side of the mirror plane. One exemplary representation of such processing is shown in FIG. 7. The innovations herein may include other computational features related to this process, such as treating the angle of arrival as a vector, preferably a unit vector, also known as direction cosines.

Turning to FIG. 7, angle of arrival measurements and processing may also make use of mirrored virtual sensor features and construction to constrain the solution on a plane. As shown in FIG. 7, a real sensor 410 may detect a signal from a source 440 along a path 430. Further, this path makes angle $\Theta$ with the constraint plane 400. Accordingly, innovative systems herein may make use of angle-of-arrival processing/data, via virtual sensor 420, by reflecting the arrival vector 430 about the plane of constraint. The result is that the angle is $-\Theta$ from the point of view of the virtual sensor.

A method of converting a mixture of time-of-arrival and azimuth-of-arrival measurements into a set of pure time-of-arrival measurements for purpose of solving a source location problem is disclosed by Showen et al., U.S. Pat. No. 7,474,589, incorporated herein by reference in its entirety. The techniques disclosed in the '589 patent can be combined with the present innovations, so that the "pseudosensors" disclosed in the '589 patent (i.e., a virtual receiver sited slightly behind the real receiver, with time of arrival values set accordingly) can be applied to both the real sensor and the mirrored virtual sensor in the present invention. Thus, each real receiver that is equipped with both time-of-arrival and angle-of-arrival measurement capability can be converted into four receivers—one real, one virtual mirrored receiver, and two virtual "pseudosensor" receivers. As such, by combining these innovations, it becomes possible to locate a source on a plane of constraint with a single azimuth-capable sensor.

Figure 8:
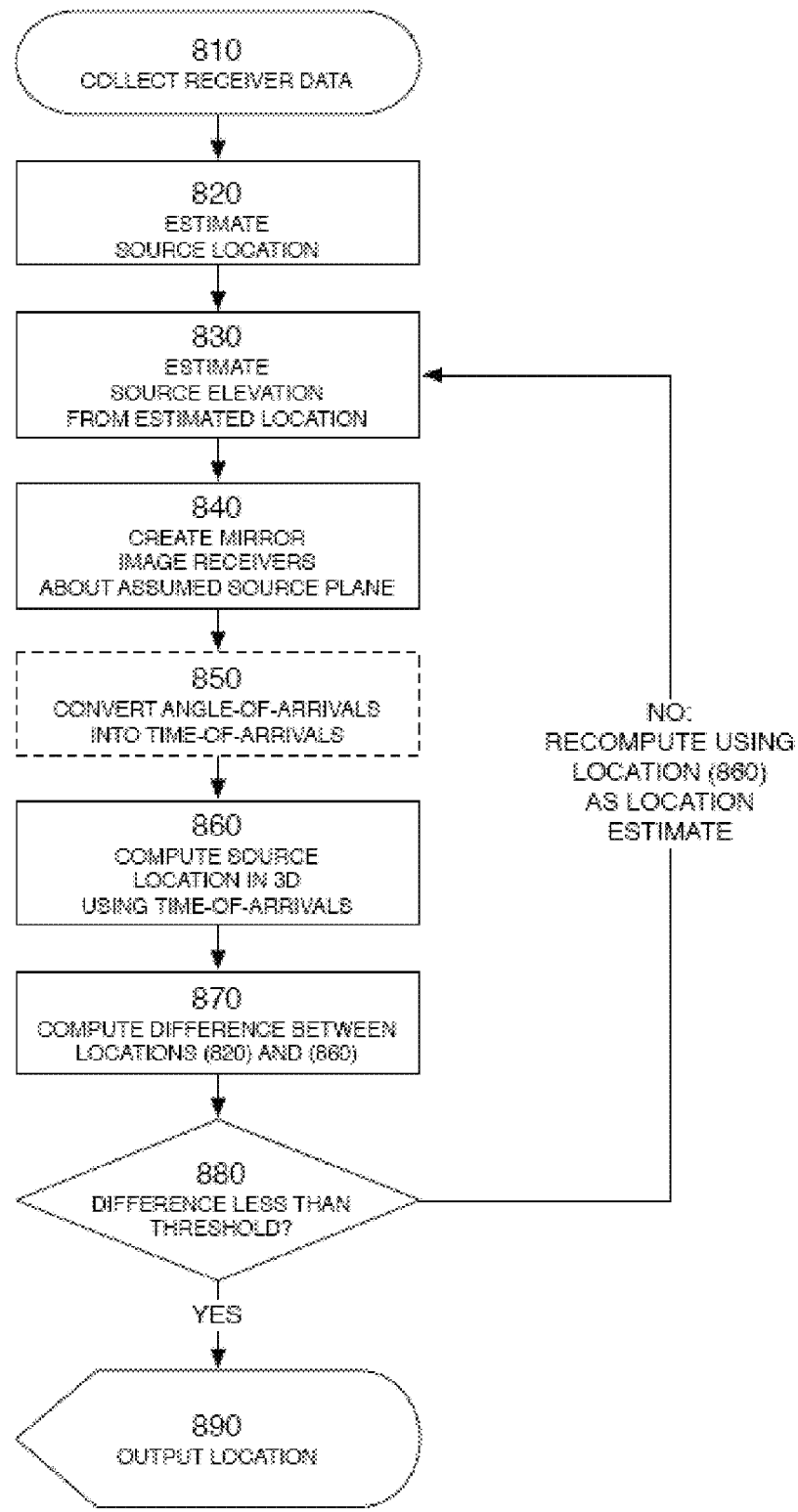
FIG. 8 is a flow diagram illustrating exemplary location estimation processing consistent with certain aspects related to the innovations herein.

FIG. 8 is a flow diagram illustrating further exemplary location estimation processing features consistent with certain aspects related to the innovations herein. Referring to the exemplary method of FIG. 8, data from a set of receivers may be collected 810. These data may comprise, for example, 3D receiver locations in suitable units plus time-of arrival, time-difference-of-arrival and/or angle of arrival measurements of the signal received. Suitable units may include degrees latitude and longitude plus meters of height above ellipsoid; meters of easting and northing in a Universal Transverse Mercator (UTM) zone plus meters of height above mean sea level; or any consistent set of units for measuring receivers in three dimensions. Using the receiver position and time- and/or angle-of-arrival data in 810, a preliminary source location is computed 820 using either an unconstrained 3D location or an approximate 2D location. This location does not need to be very accurate; for example, suitable accuracy could be obtained by assuming the source is located at the centroid of the receiving sensors. According to some implementations, this preliminary location 820 may be used to estimate the source elevation 830 by using a digital elevation model or other terrain model to estimate the elevation (as height above ellipsoid or height above mean sea level) assuming that the source is at a known height above the ground, for example 1.5 meters above the ground. The terrain may be assumed to be locally flat at the elevation specified, or more accurate results can be obtained by obtaining the slope of the ground at the specified location from the terrain model and assuming the source resides on the plane tangent to the slope of the terrain at the specified location. Once the constraint plane is specified, virtual receivers are generated 840 at mirror image positions to the real receivers. The virtual receivers receive signals at the same time as the real receivers but are at a position 2 n (x−l) where x is the real position of the receiver, n is the unit vector describing the constraint plane through point l on the plane. (When the plane of constraint is a plane at height l parallel to the surface of the earth, the mirror position of a sensor (x, y, z) is simply (x, y, 2 l−z).) If angle-of-arrival measurements are available, they can be converted into time-of-arrival measurements using the pseudosensor technique of U.S. Pat. No. 7,474,589. The pseudosensors are mirrored in the same manner as real receivers. The collected times-of-arrival (real receivers, mirrored receivers, pseudosensor receivers and mirrored pseudosensor receivers) are then used to compute a location in 3 dimensions 860 using one of the many known algorithms for computing a source location in three dimensions from sets of times-of-arrivals. Because of the mirroring construction, the least-error solution to this 3D source location problem will always reside at or very near the specified plane of constraint. Here, the location computed 860 is superior to the original estimate 820. Further, it may be that the new location estimate 860 is sufficiently far from the original estimate 820 that the original estimate terrain elevation, and thus plane of constraint, is insufficiently accurate. The two locations may thus be compared 870 and, only if the difference is less than a threshold value 880, is the routine terminated. Otherwise the location process is repeated from step 830 using the improved location estimate 860. A suitable threshold is one comparable to the resolution of the available terrain model. When no further improvements are obtained from additional processing, the processing is terminated and the final 3D location returned 890.

Figure 9A:
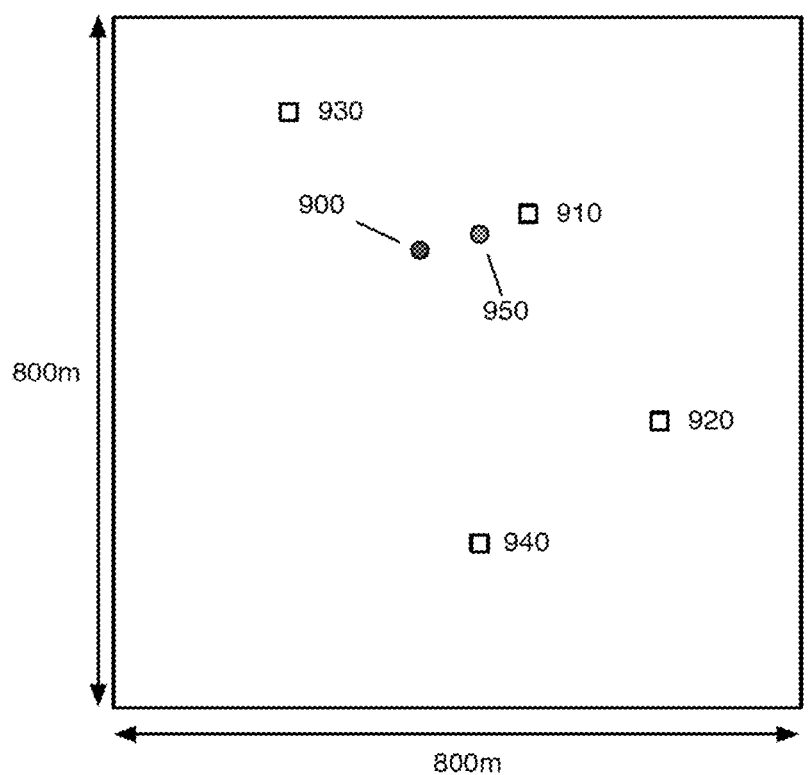
FIGS. 9A and 9B are exemplary/representative diagrams illustrating source location determination aspects consistent with certain aspects related to the innovations herein.
Figure 9B:
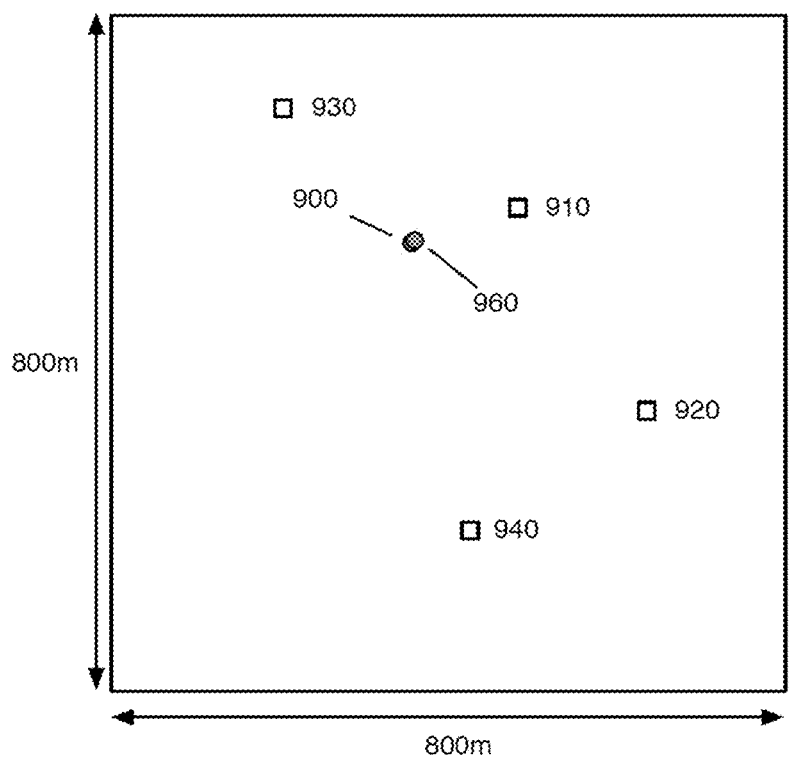

FIGS. 9a and 9b are representative diagrams illustrating source location determination processing under real test conditions, consistent with certain aspects related to the innovations herein. Referring to FIGS. 9a and 9b, source location determined from 3 discharges of an AK47 assault rifle 900 are shown, localized using time-of-arrival measurements only from a set of four acoustic receivers. FIG. 9a is a general 3-D solution; FIG. 9b illustrates a solution calculated consistent with the innovations herein.

In both figures, a first set of receivers 910, 920 are located on the ground at a height above ellipsoid of 325 meters and 298 meters, respectively. A second set of receivers 930, 940 are located in airborne vehicles flying over the coverage area at height above ellipsoid of 630 meters and 700 meters. Source location in three dimensions is required because the difference in elevation of the receivers is significant when compared to the horizontal distance between sensors. Because of unavoidable errors in measurements of receiver positions, unconstrained location in three dimensions yields a minimum-error solution that is 60 meters above the local terrain level and 65 meters away in the x-y plane from the position at which the AK47 was fired. See 950 in FIG. 9a. By constraining the solution to the local terrain elevation of 291 meters using the innovations here (FIG. 9b), the location is constrained to an elevation of 291 meters and a much more accurate location (960) is obtained. The constrained solution has a total error of 3.3 m, vs a total error of 95.5 m for the unconstrained 3D solution.

Finally, some other exemplary, generalized aspects of the innovations herein may include or involve one or more aspects of the following.

Systems or methods for solving the source location problem from a one or more receivers capable of measuring time-of-arrival and/or azimuth-of-arrival from the source in which the solution is constrained to a two-dimensional plane in a three-dimensional environment through the use of virtual sensors located at mirror image positions, and measuring arrival angles using mirrored arrival vectors with respect to the desired plane of constraint. Here, for example, weapon fire such as gunshots, weapons discharges or explosions may be located using the method of constraining the solution to a specific two-dimensional plane, such as a local approximation of the surface of the earth, in which the discharger of the weapon is known to lie.

Systems or methods for solving the source location problem from a one or more receivers capable of measuring time-of-arrival and/or angle-of-arrival from the source in which virtual receivers are placed at the mirror image positions with respect to the plane of constraint and all angle-of-arrival measurements are converted into to time-of-arrival measurements via application of the azimuthal pseudosensor technique.

Further, in systems or methods consistent with the innovations herein, elevation of the receivers may be estimated based on GPS elevation data (height above ellipsoid or height above mean sea level), or with altimeters, or with cables of known height, or via other method for measuring elevation. In one exemplary implementation, height may be obtained by using a digital model of the earth stored in the receiver or sensing element; here, a given x-y position (latitude/longitude) may then be cross-referenced against the digital model to obtain the height to be used in the processing.

In the present description, the terms component, module, device, etc. may refer to any type of logical or functional process or blocks that may be implemented in a variety of ways. For example, the functions of various blocks can be combined with one another into any other number of modules. Each module can be implemented as a software program stored on a tangible memory (e.g., random access memory, read only memory, CD-ROM memory, hard disk drive) within or associated with the computing elements, sensors, receivers, etc. disclosed above, e.g., to be read by a processing unit to implement the functions of the innovations herein. Or, the modules can comprise programming instructions transmitted to a general purpose computer or to processing hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, implementations and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe components such as software, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the location estimate features, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Other implementations of the invention will be apparent to those skilled in the art from consideration of the specification and practice of the invention disclosed herein. It is intended that the specification and examples be considered as exemplary only, with a true scope and spirit of the invention being indicated by the disclosure above in combination with the following paragraphs describing the scope of one or more implementations of the following invention.

The invention claimed is:

1. A method of determining/solving an origin location of a source of an acoustic weapon fire signal or event by use of two or more sensing elements or receivers, the method comprising:
  processing information, via one or more computer processing components of a weapon fire location system that is associated with one or more acoustic receivers, including:
    obtaining a plane of constraint characterized as a two-dimensional plane defining a surface on which a perpetrator of the weapon fire incident is located and in which the source is likely to exist/occur, the plane of constraint being a bounded region within which a subject weapon fire incident was detected;
    creating one or more virtual receiver(s) each associated with a respective real receiver, each virtual receiver being constructed as having the same signal arrival time as its respective real receiver but at a virtual position determined by reflecting the respective real receiver around the two-dimensional plane of constraint;
    processing signals calculated as coming from one or more virtual sensing elements each characterized as being located on a first side of the plane of constraint in a symmetrical position that is a mirror image position, across from a corresponding real sensing element on an opposite side of the plane;
    constraining possible origin locations of the acoustic signal or event to be located in the plane of constraint; and
    determining the origin location as a function of positions of the real sensing elements and the virtual sensing elements, time-of-arrival information of acoustic energy from the source to the real sensing elements, and virtual time-of-arrival information provided by the one or more processing components as representative of signals calculated as between the source and the virtual sensing elements, via three-dimensional trilateration of relative time-of-arrival data from the sensing elements.

2. The method of claim 1 further comprising processing angle of arrival information in determination of the origin location, wherein the real sensing elements are capable of measuring time-of-arrival and/or azimuth-of-arrival from the source.

3. The method of claim 1 further comprising processing angle of arrival information in determination of the origin location, wherein determining the origin location includes measuring arrival angles using mirrored arrival vectors with respect to the plane of constraint.

4. The method of claim 1, further comprising discarding one or more candidate origin locations that are not located on the plane.

5. The method of claim 1, wherein origin locations determined as a function of data associated with both the sensing elements and the virtual sensing elements is more accurate than an origin location determined as a function of only data associated with the sensing elements.

6. The method of claim 1 wherein the acoustic signal/event is an explosive weapon fire event and the origin location is constrained to a specific two-dimensional plane.

7. The method of claim 6, wherein the specific two-dimensional plane includes a local approximation of a surface of the earth, in which a discharger of the weapon is known to lie.

8. The method of claim 1 wherein elevation of one or more of the sensing elements or receivers is estimated using GPS elevation data.

9. The method of claim 1 wherein elevation of one or more of the sensing elements or receivers is estimated using height above ellipsoid or height above mean sea level calculations.

10. The method of claim 1 wherein elevation of one or more of the sensing elements or receivers is estimated using one or more altimeters or cables of known height.

11. The method of claim 1 wherein the plane of constraint is obtained from a digital elevation model of terrain in the area of the sensing elements or receivers.

12. The method of claim 11 wherein a planar approximation of the terrain is improved in quality by:
locating the source using a coarse terrain model that averages the terrain with a first plane over the entire coverage area of the receivers;
computing an initial location using the first plane;
re-approximating the terrain in a vicinity of the source to obtain a more exact/precise plane; and
recalculating/relocating a superior location the source using new terrain approximation information and/or the more exact/precise plane.

13. The method of claim 12 wherein the re-approximation step is performed as an iterative process.

14. A system for determining the location of an acoustic source comprising:
a computer in communication with two or more acoustic sensors or receivers;
the sensors or receivers being placed at known positions in three-dimensional space and configured to detect acoustic signals;
wherein the computer is configured to:
receive and process signals from the two or more acoustic sensors or receivers;
measure an arrival time of acoustic signals with respect to a common time base;
utilize an estimate for a plane of constraint of the three-dimensional search space most likely to contain the acoustic source, the plane of constraint characterized as a two-dimensional plane defining a surface on which a perpetrator of the weapon fire incident is located and in which the source is likely to exist/occur, the plane of constraint being a bounded region within which a subject weapon fire incident was detected;
determine a best-fit location for the acoustic source including constraining possible origin location(s) to be located in the two-dimensional plane of constraint;
create one or more virtual receiver(s) each associated with a respective real receiver, each virtual receiver being constructed as having the same signal arrival time as its respective real receiver but at a virtual position determined by reflecting the respective real receiver around the two-dimensional plane of constraint; and
process data from real and virtual receivers together to determine a best-fit location solution for the source, the process of data including three-dimensional trilateration of the measured arrival times of the acoustic signals at the receivers.

15. The system of claim 14 wherein the sensors or receivers are configured to measure at least one of: a time of arrival and/or an angle-of-arrival from the source.

16. The system of claim 14 wherein the location of the receivers is determined using measurements made from a GPS or other satellite-based navigation system.

17. The system of claim 14 wherein the two-dimensional plane of constraint is a planar approximation of the surface of the earth in the vicinity of the sensor array.

18. The system of claim 14 wherein the two-dimensional subspace is a planar approximation of the surface of the earth in the vicinity of the sensor array and a digital elevation model is used to characterize the surface of the earth for the purposes of identifying the two-dimensional subspace.

19. The system of claim 14 wherein the location estimate is successively increased in accuracy by iteratively repeating the processing steps of claim 1, each time with using the output of the location estimate to determine a better a priori estimate for the two-dimensional plane of constraint.

20. The system of claim 14 wherein the acoustic source is at least one of: a firearm muzzle blast, mortar launch, improvised explosive device, demolition blast, underwater dynamite explosion and other explosive event.

21. A system for determining the location of an acoustic source using an array of acoustic sensors or receivers, the system comprising:
a) two or more sensors, sensing devices or receivers at known positions in three-dimensional space, each receiver being configured to detect acoustic signals and to measure arrival times of the acoustic signals with respect to a common time base; and
b) one or more processing components configured to accept and process measurements made by the two or more sensors, sensing devices or receivers;
wherein the one or more processing components are configured to process an estimate for a two-dimensional plane of constraint of the three-dimensional space most likely to contain the acoustic source, the plane of constraint characterized as a two-dimensional plane defining a surface on which a perpetrator of the weapon fire incident is located and in which the source is likely to exist/occur, the lane of constraint being a bounded region within which a subject weapon fire incident was detected;
wherein the one or more processing components are configured to determine the best-fitting location for the acoustic source as constrained by the two-dimensional plane of constraint via:
a) creating create one or more virtual receiver(s) each associated with a respective real receiver, each virtual receiver being constructed as having the same signal arrival time as its respective real receiver but at a virtual position determined by reflecting the respective real receiver around the two-dimensional plane of constraint; and
b) processing data from real and virtual receivers together, including constraining possible location(s) of the source to the plane of constraint, to determine the best-fitting location solution for the source, the processing of data including three-dimensional trilateration of measured arrival times at the sensors, sensing devices or receivers.

* * * * *